Figures 1, 2:
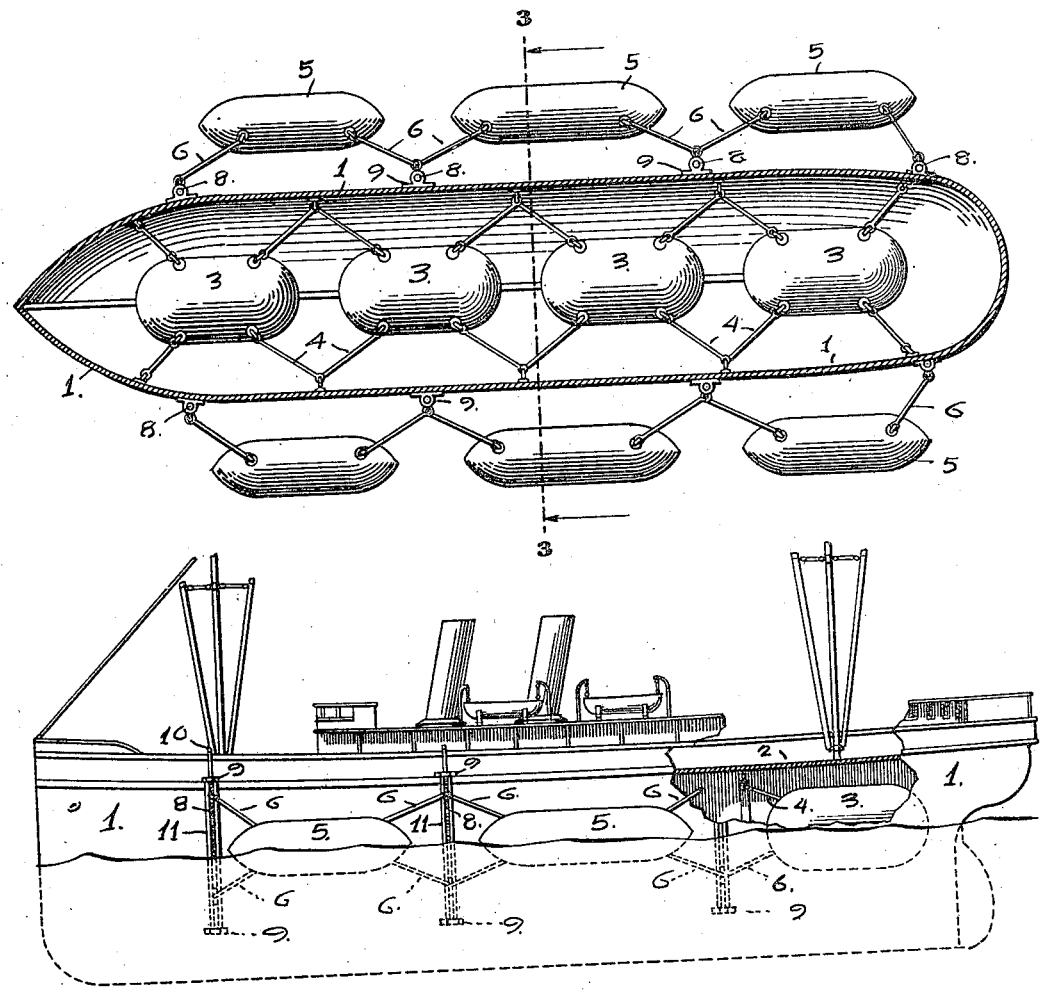

A. M. CORTEZ.
ATTACHMENT FOR VESSELS.
APPLICATION FILED OCT. 25, 1917.

1,258,987.

Patented Mar. 12, 1918.
2 SHEETS—SHEET 1.

INVENTOR.
Albert M. Cortez

A. M. CORTEZ.
ATTACHMENT FOR VESSELS.
APPLICATION FILED OCT. 25, 1917.
1,258,987.
Patented Mar. 12, 1918.
2 SHEETS—SHEET 2.
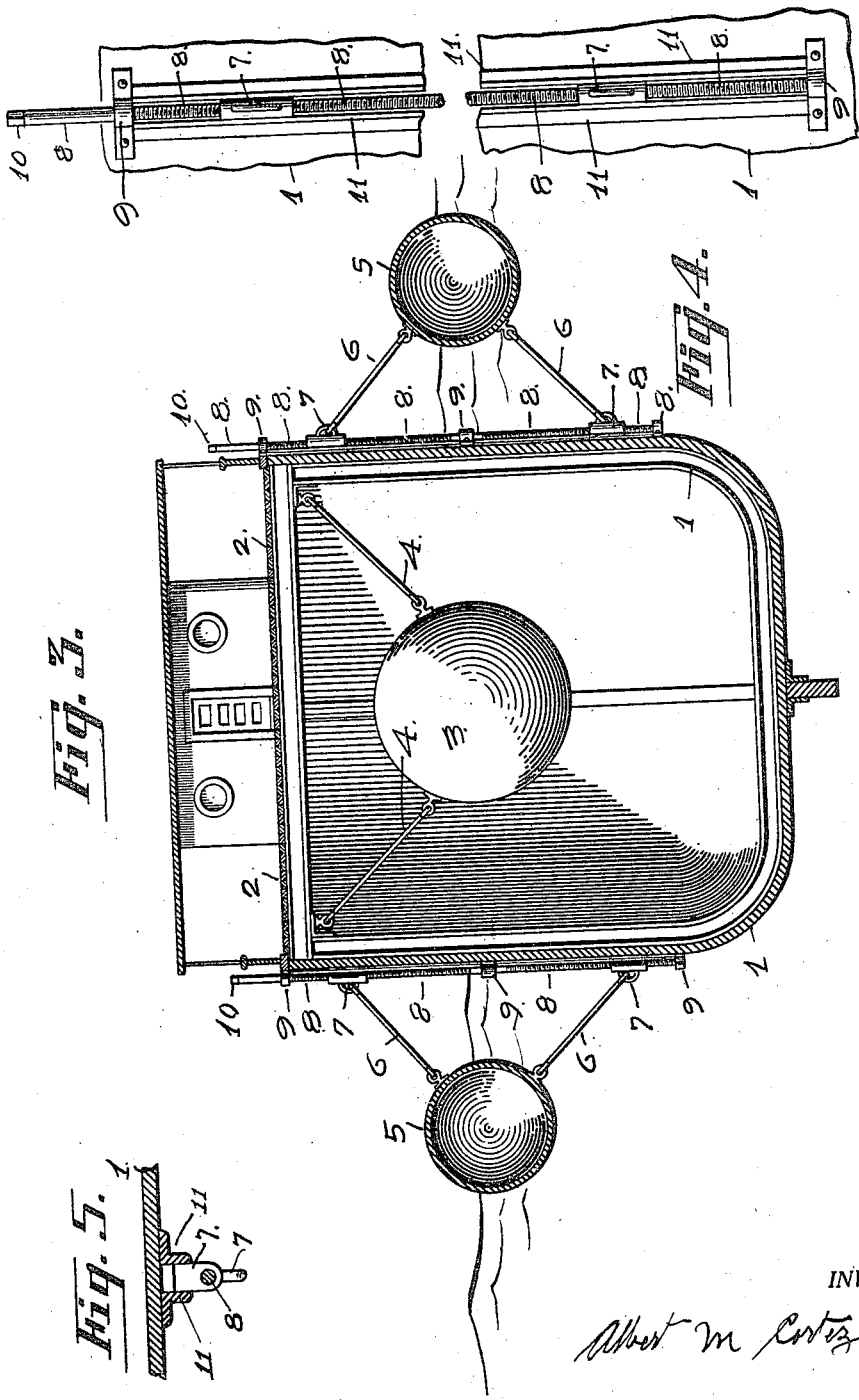
INVENTOR.
Albert M. Cortez

UNITED STATES PATENT OFFICE.

ALBERT M. CORTEZ, OF SAN FRANCISCO, CALIFORNIA.

ATTACHMENT FOR VESSELS.

1,258,987.                    Specification of Letters Patent.      Patented Mar. 12, 1918.

Application filed October 25, 1917.   Serial No. 198,537.

*To all whom it may concern:*

Be it known that I, ALBERT M. CORTEZ, a citizen of the Republic of Portugal, residing in the city and county of San Francisco and State of California, have invented a new and useful Attachment for Vessels, of which the following is a specification.

My invention relates to improvements in attachments for vessels in which suspended floats operate in conjunction with the vessel; and the objects of my invention are, first, to provide improved means for sustaining a vessel on the surface of the water after the hold has become filled or partially filled with water to an extent likely to reduce the buoyancy thereof; second, to provide a second series of floats arranged around the outer sides of the vessel and at a distance therefrom to operate in conjunction with the inner suspended floats; third, to provide improved means for moving the outer floats away from or toward the sides of the vessel to facilitate the docking of said vessels.

I attain these objects by the mechanism illustrated in the accompanying drawings, in which—

Figure 1 is a horizontal sectional view of the hull of a vessel disclosing the arrangement of the inner and outer floats; Fig. 2 is a broken side elevation of the vessel with the floats attached thereto; Fig. 3 is a vertical section of a part of the vessel on the line 3—3, Fig. 2; Fig. 4 is an enlarged broken elevation of a portion of one side of the vessel disclosing one of the guides; and Fig. 5 is a plan view of Fig. 4.

Similar numerals refer to similar parts throughout the several views.

The hull 1 and its deck 2 constitute the vessel in general. A series of floats 3 are suspended inside of the hull 1 by means of suitable rods 4 which are in turn suspended from the lower side of the deck 2 and preferably from the beam ends or sides of said deck 2.

A second series of floats 5 are floated or suspended within the water surrounding the hull 1 and are connected to the said hull 1 by means of stays or rods 6 which in turn are connected to eyelets 7 screwed upon vertically disposed threaded rods 8 rotatably mounted upon the sides of the hull 1 by means of suitable bearings 9.

The rods 8 are threaded in opposite directions from their approximate centers and toward opposite ends thereof so that when said rods 8 are rotated the threaded eyelets 7 on each rod 8 will be moved toward or away from each other according to the direction in which said rods 8 are rotated.

Each rod 8 is squared on its upper end as at 10 to receive a suitable crank or handle, not shown, to facilitate rotation of said rods 8.

Each eyelet 7 extends into suitable guides 11 arranged on the sides of the hull 1 and adjacent the rods 8 so as to slidably engage said eyelets 7 to prevent rotation thereof when the rods 8 are rotated thereby causing said eyelets 7 to be moved toward or away from each other by the action of the threaded rods 8.

In operation the second series of floats 5 are normally held away from the sides of the hull 1 by the rigid rods 6 so that when the ship is torpedoed or the hull 1 otherwise penetrated to admit water in quantities the floats 5 operating in conjunction with the first mentioned series of floats 3 will tend to sustain the vessel upon the surface of the water by their additional buoyancy until port may be reached.

To facilitate the docking of the vessel the rods 8 are rotated in a direction which will cause the eyelets 7 thereon to move away from each other thereby spreading the inner ends of the rods 6 and drawing the floats 5 in toward the vessel 1.

The inner floats 3 are suspended away from sides of the vessel so as to prevent a contact with said sides which might tend to rupture or destroy said floats 3 when said sides are destroyed by the explosion of a floating mine or torpedo.

Should the vessel 1 become filled with water the floats 3 would rise to the under side of the deck 2 and by reason of their buoyancy tend to assist in sustaining the vessel on the surface of the surrounding water until a port is reached.

Having thus described my invention what I claim as new and desire to secure by Letters Patent is—

1. An attachment for vessels comprising a series of floats suspended within the vessel; and a series of floats attached to the sides of the vessel and at a distance therefrom, both series of floats being adapted to sustain the vessel when water has been admitted to the hold thereof.

2. An attachment for vessels comprising a series of floats suspended within the hold of a vessel and away from the walls thereof; and a second series of floats arranged on the outer sides of the vessel and at a distance therefrom, both series of floats being arranged to sustain the vessel on the surface of a body of water when water has been admitted to the hold of said vessel.

3. An attachment for sustaining vessels comprising a series of floats suspended within the hold of a vessel and away from the sides thereof; a second series of floats slidably attached to the outer sides of the vessel and at a distance therefrom, said second series being arranged to float upon the surface of surrounding water; and means for regulating the distance between the second series of floats and the sides of the vessel.

4. The combination with a vessel of a series of rods threaded in opposite directions from the center toward the ends thereof and rotatably mounted upon the sides of the vessel; eyelets screwed upon opposite ends of each rod; a series of floats arranged around the outer sides of the vessel; rods connecting the floats with the eyelets whereby the distance between the floats and the vessel may be regulated by rotating the threaded rods; and a second series of floats suspended within the hold of the vessel and away from the walls thereof, both series of floats being arranged to sustain the vessel on the surface of the water after water has entered the hold thereof.

5. The combination with a vessel of a series of floats suspended within the hold of the vessel and away from the walls thereof; a series of vertically disposed rods threaded in opposite directions from their approximate centers toward the ends thereof and rotatably mounted upon the sides of the vessel; eyelets screwed onto opposite ends of each rod; means for preventing the rotation of the eyelets when the rods are rotated whereby the eyelets on opposite ends of the same rod may be moved away from or toward each other when said rods are rotated; a second series of floats suspended in the water and a distance from the outer sides of the vessel; and rods connecting the second series of floats with the eyelets on the threaded rods whereby the distance between said floats and the sides of the vessel may be regulated and adjusted when the rods are rotated.

6. The combination with a vessel of a series of floats suspended within the hold of a vessel and away from the walls thereof; a series of vertically disposed rods rotatably mounted upon the outer sides of the vessel, each rod being threaded in opposite directions from the approximate center toward the ends thereof; a pair of guides arranged adjacent each rod; eyelets screwed on the opposite ends of each rod and slidably mounted within the guides; a second series of floats suspended within the water surrounding the vessel and at a distance from the sides of the vessel; and a series of rods connecting the second series of floats with the eyelets whereby said second series of floats may be moved away from or toward the sides of the vessel when the threaded rods are rotated to move the eyelets thereon toward or away from each other.

In witness whereof I hereunto set my signature in the presence of two subscribing witnesses.

ALBERT M. CORTEZ.

Witnesses:
JOSEPH F. ROZA,
ETTA LAIDLAW.

Copies of this patent may be obtained for five cents each, by addressing the "Commissioner of Patents, Washington, D. C."